United States Patent Office
2,748,160
Patented May 29, 1956

2,748,160
PROCESS FOR PREPARING 2,5-DIACETOXYSTYRENE AND INTERMEDIATES THEREFOR

Delbert D. Reynolds and Jack L. R. Williams, Rochester, N. Y., assignors to Eastman Kodak Company, Rochester, N. Y., a corporation of New Jersey No Drawing. Application April 15, 1952,
Serial No. 282,456

10 Claims. (Cl. 260—479)

This invention relates to the preparation of 2,5-diacetoxystyrene and a process for its preparation. It also relates to intermediates involved in the preparation of 2,5-diacetoxystyrene and to the ultimate deacetylation thereof.

We have found that 2,5-diacetoxystyrene can be produced in good yields by a highly satisfactory process which relates primarily to the pyrolysis of the triacetate of 2,5-dihydroxyphenylmethyl carbinol. We have devised an overall process whereby an improved method is disclosed for preparing acetyl hydroquinone and/or the acetate esters thereof which can be hydrogenated to form 2,5-dihydroxyphenylmethyl carbinol or acetate esters thereof which can be then treated, if necessary, with acetic anhydride to form the triacetate. The triacetate of 2,5-dihydroxyphenylmethyl carbinol is then pyrolyzed at between 400° and 650° to produce 2,5-diacetoxystyrene. This product, viz. 2,5-diacetoxystyrene can be deacetylated to form 2,5-dihydroxystyrene.

It is an object of our invention to prepare 2,5-diacetoxystyrene by an especially advantageous process. It is a further object to prepare 2,5-dihydroxyphenylmethyl carbinol triacetate by an especially advantageous process. Another object is to provide an improved process for synthesizing acetyl hydroquinone. An additional object is to provide a process for the preparation of 2,5-dihydroxystyrene. Still further objects are apparent elsewhere within this specification.

An overall process which can be employed for the preparation of 2,5-dihydroxystyrene can be represented by the following schematic arrangement:

(A) 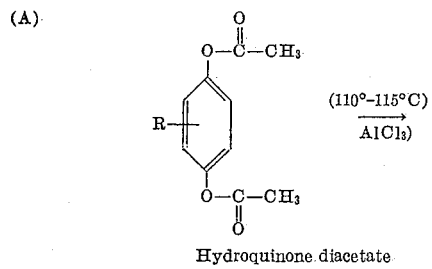
Hydroquinone diacetate (B) 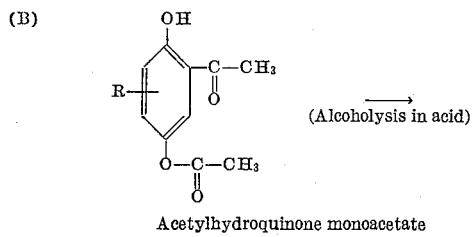
Acetylhydroquinone monoacetate (C) 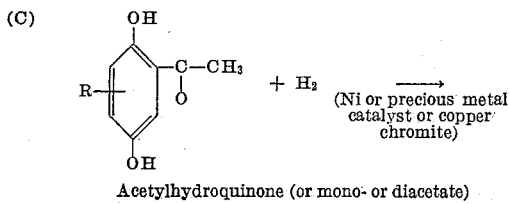
Acetylhydroquinone (or mono- or diacetate)

(D) 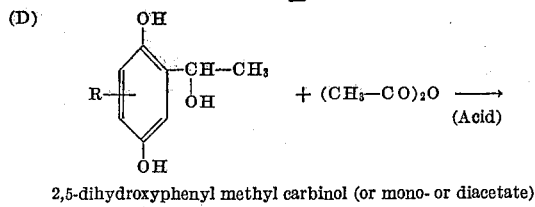
2,5-dihydroxyphenyl methyl carbinol (or mono- or diacetate)

(E) 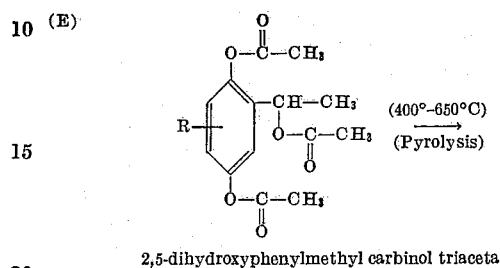
2,5-dihydroxyphenylmethyl carbinol triacetate (F) 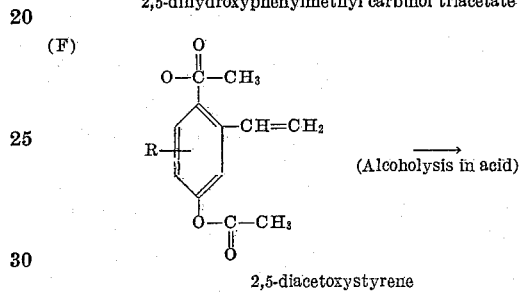
2,5-diacetoxystyrene (G) 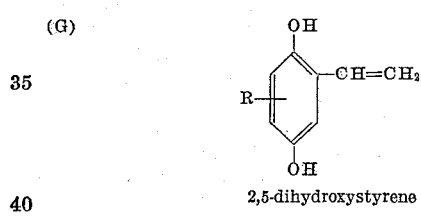
2,5-dihydroxystyrene wherein R represents a hydrogen atom or a lower alkyl radical, e. g. methyl, ethyl, etc. Steps C and D can readily be reversed by acetylating the acetyl hydroquinone with acetic anhydride prior to hydrogenation; similarly, step B can be eliminated altogether as being unnecessary.

A number of methods for preparing acetyl hydroquinone have been described in the literature. All of these methods leave much to be desired. The published methods which are most useful involve a Fries rearrangement as illustrated by reaction of hydroquinone diacetate in the presence of aluminum chloride at about 150° C. to form acetyl hydroquinone (Organic Syntheses, 28, page 42, published in 1928). It has been found, however, that by reacting hydroquinone diacetate with aluminum chloride at 110–115° C. (step A in the above schematic arrangement), a product is obtained which is essentially acetyl hydroquinone monoacetate. A small percentage of acetyl hydroquinone is mixed with this monoacetate. These two crystalline compounds can be separated due to their differential solubility in the ether or dioxane. Acetyl hydroquinone monoacetate is a white-crystalline product, M. P. 93° C. The monoacetate can be easily and readily deacetylated to yield acetyl hydroquinone, M. P. 205–206° C. (step B in the above schematic arrangement). It can also be acetylated to give the known acetyl hydroquinone diacetate, M. P. 70° C.

By following the preferred procedure (step A) at 110–115° C., the initial product comprising essentially acetyl hydroquinone monoacetate may be treated with a deacetylating agent (step B) such as anhydrous hydrogen chloride dissolved in methyl alcohol. As a result of such treatment, this process results in high yields of acetyl hydroquinone in a very pure form. In connection with this aspect of the process an article by R. D. Desai and C. K. Mavani, in Proceedings of the Indian Academy of Science, 29A, 269–73 (1949) is of interest as disclosing the effects of various concentrations and temperatures.

A preferred procedure for the preparation of acetyl hydroquinone can be illustrated by the following example:

EXAMPLE 1

*Acetyl hydroquinone (steps A and B)*

200 grams of hydroquinone diacetate ground to 20 mesh was thoroughly mixed with 400 grams of anhydrous aluminum chloride. One-third of this mixture was added to a 1-liter beaker suspended in an oil bath maintained at 115–120° C. After the initial reaction began (2–4 minutes), the mixture was stirred vigorously with a glass rod until the reaction subsided (2–3 minutes). A second one-third portion was added and rapid stirring repeated. Then the last portion was added after the reaction again subsided. The final reaction mixture was stirred rapidly for about 10 minutes. Heating (110–115° C.) and stirring were continued for an additional 20 minutes. The cooled mixture was ground in a mortar and then stirred into 4 liters of crushed ice containing 200 cc. concentrated hydrochloric acid. After being stirred for ½ hour, the mixture was filtered and the residue washed with 1 liter of cold water. The product was air dried and then dried over $P_2O_5$ in vacuum. Yield was 185 grams. This product is predominantly acetyl hydroquinone monoacetate mixed with some acetyl hydroquinone and perhaps a small amount of unchanged hydroquinone diacetate. (A sample recrystallized from methanol melted at 80–85° C.) This product was then stirred for 1 hour with 375 grams of a 5 percent hydrogen chloride-in-methanol solution and then stirred into 2 liters of ice water. After filtration, the residue was washed with 1 liter of cold water and air dried. After drying over $P_2O_5$ in vacuum, a product weighing 117 grams was obtained which melted sharply at 203–204° C. Recrystallization from alcohol containing decolorizing carbon raised the melting point to 204–204.5. Yield was 75 percent.

Although the above method involves two steps (A and B), it is not more time-consuming than that described in Organic Syntheses since the first step is complete in one-half hour. It possesses the advantages that it is readily reproducible, consistently high yields are obtained, it can be adapted to large batch preparations and a pure product is obtained since the deacetylation step removes any unconverted starting materials as water-soluble hydroquinone.

The third step (C) of the over-all process depicted in the above schematic arrangement involves the reduction by hydrogenation of acetyl hydroquinone to form 2,5-dihydroxyphenylmethyl carbinol. This results in the preparation of a novel compound which is not believed to have been described heretofore. A nitro derivative of this compound has been described in the literature; however, no suggestion is made of 2,5-dihydroxyphenylmethyl carbinol nor does the process employed for the preparation of the nitro derivative have any relationship to the process involved in the preparation of 2,5-dihydroxyphenylmethyl carbinol.

In an article by T. B. Johnson and W. W. Hodge, Journ. Amer. Chem. Soc., 35, 1014–1023 (1913), it is disclosed that zinc-amalgam when employed as a reducing agent, results in the conversion of acetyl hydroquinone into ethyl hydroquinone. Nothing in the Johnson article indicates that intermediate products which have been reduced to lesser extent are formed.

Attempts to reduce acetyl hydroquinone to 2,5-dihydroxyphenylmethyl carbinol by using copper chromite catalyst under high pressure (2500 p. s. i. at temperatures above 120° C.) have been unsuccessful. Instead of the desired products, a good yield of ethyl hydroquinone has been obtained as is further described and claimed in our application Serial No. 366,076 filed July 3, 1953. It has now been found that the employment of lower temperatures results in the preparation of the desired carbinol.

Furthermore, we have found that Adams catalyst (platinum oxide) is a good catalyst for the conversion of acetyl hydroquinone to 2,5-dihydroxyphenylmethyl carbinol at low pressure of hydrogen. However, in order to reduce acetyl hydroquinone within a fairly short period of time, it was found necessary to use higher proportions of the catalyst. The amount of catalyst can be decreased and the time required for reduction lessened considerably if a promoter is used. Acetic acid was found to be such a promoter. Other similar promoters include ferrous sulfate and mercurous chloride.

When acetyl hydroquinone or its diacetate is hydrogenated, the reduction is not necessarily limited to the carbonyl group when a catalyst such as copper chromite is employed, e. g. the carbonyl group may be reduced to a methylene group. Moreover, the benzene nucleus may be hydrogenated. It is evident from the various examples presented hereinbelow that some secondary reductions take place even at low pressures when Adams catalyst (platinum oxide) is employed.

The reduction of acetyl hydroquinone diacetate does not necessarily follow the same pattern with respect to catalysts as does acetyl hydroquinone. Raney nickel W–6, which has been found to be an excellent catalyst for reducing acetyl hydroquinone at low pressure, produces no reduction of the diacetate under the same conditions. Copper chromite catalysts at 2500 lbs. per square inch of hydrogen pressure and 150° C. cause some deacetylation evidenced by the odor of ethyl acetate and acetic acid present in the reaction product (in an experiment at about 150° C. about one-fourth of the starting material was recovered, and no 2,5-diacetoxyphenylmethyl carbinol was isolated).

It has been found that nickel hydrogenation catalysts are excellent catalysts. Raney nickel W–6, J. Am. Chem. Soc., 70, 695 (1948), has been found to be an excellent example of such a catalyst for the reduction of acetyl hydroquinone to form 2,5-dihydroxyphenylmethyl carbinol. The pressures of hydrogen (which are all given as gauge pressures) which can be employed using a nickel catalyst can be varied considerably, e. g. from about 25 to 30 lbs. per square inch up to as much pressure as the reaction vessel can withstand, e. g. 1000 lbs. per square inch of hydrogen pressure. Good results have been obtained using a Parr low pressure hydrogenator wherein the initial gauge pressure of hydrogen was about 50 lbs. per square inch. Temperatures below about 50° C. can be employed; temperatures preferably not above 40° C., e. g., from about 20° to 40° C. are advantageously employed. We have found that the secondary reductions are practically eliminated when Raney nickel W–6 is used as the catalyst. Moreover, the reduction can be completed in a relatively short time. Since the rate of reduction is a function of catalyst concentration, it is advantageous to use Raney W–6 due to its relatively small cost as compared with platinum oxide. It therefore seems quite apparent that Raney nickel W–6 is an unexpectedly superior catalyst for this particular reduction.

Raney nickel, W–6 and W–7 are both prepared by first employing an alkali for leaching out the aluminum from a nickel-aluminum alloy at a temperature of about 50° C. This particular first step in forming these particular species of Raney nickel catalysts results in the retention of some of the evolved hydrogen on the surface of the catalyst which consequently renders the catalyst more active. In preparing Raney nickel W–6 and W–7 this first step is then followed by washing the leached product with water so as to remove the alkali. Raney nickel W–6 is prepared by washing with a relatively large amount of water under hydrogen pressure so that the catalyst retains the absorbed hydrogen and is substantially free of alkali, whereas Raney nickel W-7 is prepared by washing with only a limited amount of water at atmospheric pressure whereby the catalyst is more alkaline than Raney nickel W-6 but still retains a large amount of absorbed hydrogen. It is quite apparent that either Raney nickel W-6 or W-7 can be used according to this invention in the same manner and with similar results since they are essentially equivalent to each other. These two species of Raney nickel are described in the above-mentioned article by Adkins and Billica, J. Am. Chem. Soc. 70, 697 (1948).

As indicated above, it has been further found that copper chromite is an excellent catalyst at higher temperatures and pressures. Pressures of from about 1000 p. s. i. to about 6000 p. s. i. can be advantageously employed; higher and lower pressures can also be employed. Temperatures of from about 100° C. to about 115° C. can be employed; higher and lower temperatures can also be employed. The preferred range is about 105° to about 110° C. The amount of copper chromite can advantageously be from about 1% to about 30% based on the weight of acetylhydroquinone being reduced. Higher or lower quantities can also be employed. The preferred range is from about 2.5% to about 15%. The hydrogenation is advantageously allowed to continue until about an equimolecular quantity of hydrogen has been absorbed; the temperature must be carefully regulated to avoid exceeding about 120° C. The hydrogenation is advantageously conducted in a solvent which is advantageously removed by evaporation upon completion of the reaction, being careful not to employ temperatures above about 40° C. or higher which encourage the formation of polymeric by-products.

The hydrogenation can be conducted in the presence of any solvent which is inert to the hydrogenation conditions employed and to the reactants involved. Examples of such solvents include the lower aliphatic alcohols, e. g. methyl alcohol, ethyl alcohol, isopropyl alcohol, amyl alcohol, etc., i. e., an alcohol containing from 1 to about 8 carbon atoms and lower aliphatic ethers, e. g. diethyl ether, ethyl propyl ether, etc., i. e., an ether containing from 2 to about 12 carbon atoms, etc., etc.

The following Examples 2, 3, 4 and 5 illustrate the hydrogenation of acetyl hydroquinone to form 2,5-dihydroxyphenylmethyl carbinol (step C):

EXAMPLE 2

Hydrogenation employing platinum oxide

Acetyl hydroquinone (45.6 grams) was mixed with 200 cc. of ethanol containing 3 grams of platinum oxide catalyst. The mixture was shaken for seven hours at room temperature on a Parr low pressure hydrogenator. The pressure dropped from 50 lbs. to 16 lbs. per square inch of hydrogen pressure; the initial pressure being introduced into the hydrogenator was 50 lbs. per square inch at the commencement of the reaction. The catalyst was removed by centrifuging and the solution acidified with 5 cc. of acetic acid. The alcohol (ethanol) was removed by distillation under reduced pressure. The product consisted essentially of 2,5-dihydroxyphenylmethyl carbinol which was then acetylated as described below in Example 7.

EXAMPLE 3

Hydrogenation employing platinum oxide and a promoter

Acetyl hydroquinone (45.6 grams) was mixed with 200 cc. of methanol containing 1 gram of platinum oxide and 6 drops of acetic acid. The reduction and isolation procedure in Example 2 was then followed. The reaction required only about 2½ to 3 hours for completion.

As pointed out hereinabove, Raney nickel is a very effective catalyst and its employement in step C is illustrated as follows:

EXAMPLE 4

Hydrogenation employing Raney nickel (step C)

Acetyl hydroquinone (45.6 grams) was mixed with 200 cc. of methanol containing about ½ teaspoonful of W-6 Raney nickel catalyst which was wet with alcohol. The reduction was complete in about ½ to 1 hour, the rate of reaction being dependent upon the concentration of catalyst employed. The catalyst was removed by centrifuging, 5 cc. of acetic acid was then added, and the methanol removed by vacuum distillation. The distillation flask was not heated above 40° C. The 2,5-dihydroxymethyl carbinol was thus obtained as a clear syrup.

The following example illustrates the employment of copper chromite as the hydrogenation catalyst.

EXAMPLE 5

Hydrogenation employing copper chromite (step C)

In a stainless-steel reactor there was placed 41 grams (0.27 mole) of acetylhydroquinone, 120 cc. of absolute ethanol and 4 grams of copper chromite catalyst. The reactor was closed and pressurized with hydrogen to 3000 p. s. i. The temperature of the reactor was raised to 105° at which temperature 0.27 mole of hydrogen was absorbed. Careful control of temperature was required, since further hydrogen is absorbed at 120–140° to yield not the desired carbinol but ethylhydroquinone. The cooled reactor was opened and the contents removed. The catalyst was filtered after the addition of one-half milliliter of acetic acid and the ethanol removed at the water pump by means of a 35–40° water bath. Higher temperatures (60–80°) produce polymers which turn up at the distillation step later.

If desired, the acetyl hydroquinone can be acetylated to form acetyl hydroquinone mono- or diacetate in a manner similar to that described for the acetylation of 2,5-dihydroxyphenylmethyl carbinol as set forth in Example 7 or acetyl hydroquinone monoacetate from step A can be hydrogenated. The mono-ester of acetyl hydroquinone can be hydrogenated as in Example 5.

EXAMPLE 6

Hydrogenation of acetyl hydroquinone diacetate

Acetyl hydroquinone diacetate (70.8 grams) was mixed with 200 cc. of methanol containing 1 gram of platinum oxide catalyst. One molecular equivalent of hydrogen was absorbed in 2 to 3 hours. The catalyst was then removed and the methanol distilled under a vacuum. The product was 2,5 - diacetoxyphenylmethyl carbinol which was a clear syrupy liquid. This product can be acetylated (step D) in the manner described in Example 7 and the triacetate converted to vinyl hydroquinone diacetate by the procedure described in Example 9 (step E). The clear, syrupy 2,5-diacetoxyphenylmethyl carbinol can readily be separated from the unreduced starting material and the product purified by recrystallization. Recrystallization from isopropyl ether has resulted in the production of a purified product having a melting point of 106–107° C.

The 2,5-dihydroxyphenylmethyl carbinol prepared in accordance with any of Examples 2, 3, 4 or 5 can readily be acetylated with acetic anhydride containing a small amount of a concentrated acid, e. g. sulfuric acid. This is illustrated by the following Examples 7 and 8:

EXAMPLE 7

Acetylation (step D)

The product which was obtained from Example 2, which was essentially 2,5-dihydroxyphenylmethyl carbinol, was mixed with 250 cc. of acetic anhydride containing 5 drops of concentrated sulfuric acid. After 15 hours, the acetic acid and remaining anhydride (if any) were removed by vacuum distillation. The residue was dissolved in 500 cc. of thiophene-free benzene and washed with cold water to remove the sulfuric acid. The benzene layer was dried over calcium chloride, the benzene removed by vacuum distillation, and the product distilled at 140–150° C. at 0.25–0.4 mm. of Hg pressure. The product obtained was 2,5-dihydroxyphenylmethyl carbinol triacetate which can also be designated as alpha-(2,5-diacetoxyphenyl) ethyl acetate.

EXAMPLE 8

Acetylation (step D)

In this example, residue from Example 5 (2,5-dihydroxyphenyl methyl carbinol), was employed. The residue was allowed to stand 18 hours at room temperature with 200 grams of acetic anhydride and 0.5 cc. of pyridine, after which time any ethyl acetate formed together with acetic acid was removed by evaporation of the reaction mixture to 100 cc. at the water pump by means of a 35–40° water bath. The concentrate was heated with 100 cc. of acetic anhydride at 60° for 3 hours, cooled and washed with two 200 cc. portions of water. The organic material was dried over anhydrous magnesium sulfate and distilled. After the acetic anhydride had distilled at the water pump the residue was distilled by means of a high-vacuum pump to yield 65 grams (86%) of the 2,5-dihydroxyphenyl methyl carbinol triacetate, B. P. 124–130°, $n_D^{25}$ 1.4968.

The 2,5-dihydroxyphenylmethyl carbinol triacetate prepared in accordance with Examples 7, 8, or as indicated in Example 6 is pyrolyzed in order to form vinyl hydroquinone diacetate (step E). The pyrolysis is brought about in the vapor phase over an inert packing material at 400° to 650° C., preferably at from about 450° to about 600° C. The optimum temperature from the standpoint of avoiding side reactions has been found to be between 500 and 520° C. when the inert packing material employed is glass beads. Lower or higher temperatures result in the formation of lower yields of vinyl hydroquinone diacetate. The pyrolysis can be conducted with or without the presence of an inert hydrocarbon solvent. In conducting the pyrolysis a hollow tube can advantageously be employed containing the inert packing material such as a ceramic material, e. g. small pieces of glass or the like. The tube containing the packing material can be heated by any suitable means. An electric furnace is preferred as the heating means because of the ease with which the desired temperature range can be maintained and controlled. Advantageously, the 2,5-dihydroxyphenylmethyl carbinol triacetate can be preheated to a temperature of from about 40° to about 100° C.; however, such preheating is not necessary. The preheated material can advantageously then be introduced slowly into the pyrolysis tube, e. g., by passing it dropwise into the tube. It is advantageous to pass a stream of an inert gas, e. g., nitrogen, through the tube concurrently with the introduction of the 2,5-dihydroxyphenylmethyl carbinol triacetate. The stream of inert gas containing the pyrolysate can then be collected in a suction flask which is advantageously maintained at a reduced temperature whereby the pyrolysate is condensed. Advantageously, a suitable pyrolysis tube is packed with an inert ceramic packing material for a distance of about 25 to about 60 times the inside diameter of the tube although this distance can be varied considerably. The rate of introducing the 2,5-dihydroxyphenylmethyl carbinol into such a pyrolysis tube can be advantageously varied considerably and can be calculated on the space velocity basis using the following examples as criteria therefor.

The following example illustrates the method for pyrolyzing 2,5-dihydroxyphenylmethyl carbinol triacetate (step E):

EXAMPLE 9

Pyrolysis (step E)

220 grams (0.78 mol.) of 2,5-dihydroxyphenylmethyl carbinol triacetate, preheated to 45° C., was passed dropwise at one drop per two seconds by means of a dropping funnel through a 25-mm. outside diameter Pyrex tube packed for a distance of 76 cm. with ⅛-inch glass beads and heated to a temperature of 500–520° C. by means of an electric furnace. The pyrolysate was swept through the pyrolysis tube by a 100-cc.-per-minute nitrogen stream and collected in a suction flask cooled in a Dry Ice-carbon tetrachloride and chloroform (50:50) bath. After the addition of an equal volume of benzene, the pyrolysate was washed successively with 1-liter portions of saturated sodium chloride and 10 percent sodium carbonate solutions, then dried over anhydrous magnesium sulfate. The dried solution was filtered, the benzene removed by distillation and the residue distilled at reduced pressure through a Claisen-type apparatus yielding 113 grams of yellow oil, boiling point 100–115° C., 0.1–0.3 mm. of Hg pressure. 50 ml. of methanol was added to the oil and the solution allowed to stand at 0° C. until crystallization of the white solid was complete. The yield was 68.0 grams (39.5 percent). A sample recrystallized from benzene-petroleum ether, melted at 49–50° C., and was analyzed and found to contain 65.30% C and 5.50% H as compared to the calculated amounts based on the formula $C_{12}H_{12}O_4$ of 65.44% C. and 5.50% H. A crystalline dibromide was prepared, melting point 89–90° C., and a sample analyzed and found to correspond very closely to the formula $C_{12}H_{12}O_4Br_2$, thus the analysis showed 39.90% C, 3.20% H and 40.9% Br as compared to the calculated 37.90% C, 3.14% H and 42.0% Br.

EXAMPLE 10

Pyrolysis (step E)

A mixture of 60 grams of 2,5-dihydroxyphenyl methyl carbinol triacetate and 60 grams of thiophene free benzene was passed dropwise during 1.75 hours through a 25-mm. O. D. Pyrex tube packed for a distance of 76 cm. with 6 x 6 mm. Raschig rings (Pyrex) and heated to 495–505° C. by means of an electric furnace. The pyrolysate was swept through the tube by means of a 100-cc.-per-minute dry nitrogen stream and collected in a suction flask cooled in a Dry Ice-carbon tetrachloride and chloroform bath. The reaction product was washed with two 100-cc. portions of water after the addition of an equal volume of benzene. After the addition of a trace of picric acid, the organic material was dried over anhydrous magnesium sulfate and distilled. The benzene was distilled at the water pump by means of a 35–40° water bath and the residue distilled to yield 29 grams of material, M. P. 49–50° (porous plate), B. P. 98–106°/0.15 mm. Recrystallization from a mixture of 30 grams of ethyl ether and 100 grams of hexane yielded 20 grams of vinyl hydroquinone diacetate, M. P. 50.5–51.5°.

The procedure described in Example 9 was also performed employing the 2,5-dihydroxyphenylmethyl carbinol triacetate in the form of a solution in benzene. The triacetate solution in benzene was added to the pyrolysis tube at the rate of 2 drops per second which was found to be an advantageous rate employing the above conditions and apparatus. Higher and lower rates can also be employed. Pyrolysis without the use of benzene as a solvent was not found to be more efficient than with the presence of benzene.

The 2,5-diacetoxystyrene prepared in accordance with the Examples 9 or 10 or by any suitable modification thereof can be deacetylated to form 2,5-dihydroxystyrene (vinyl hydroquinone) (step F). The deacetylation can be conducted by any conventional means and the conditions employed can be varied as to time, temperature, solvents, deacetylating agents, etc. The deacetylating agents employed are advantageously acidic. The temperatures employed are advantageously relatively low. Advantageously, a solution of hydrogen chloride in an aliphatic alcohol can be employed as the deacetylating agent. Most advantageously a solution of hydrogen chloride dissolved in methyl or ethyl alcohol can be employed. However, other strong acids can be employed such as sulfuric acid, hydrobromic acid, phosphoric acid, trichloracetic acid, etc. In the copending application, Serial No. 282,487, filed on even date herewith by L. M. Minsk, D. D. Reynolds and J. L. R. Willams, details and examples are given of the deacetylation of polymers of 2,5-diacetoxystyrene which details and examples are readily adaptable to the deacetylation of the monomer in clearly obvious fashion. This copending application also discloses the preparation of interpolymers of 2,5-diacetoxystyrene with other unsaturated compounds and the deacetylation thereof. In another application filed on even date herewith by L. M. Minsk, Serial No. 282,489, now U. S. Patent No. 2,694,693, a process is disclosed for the preparation of polymers and interpolymers of vinyl hydroquinone which is the deacetylated 2,5-diacetoxystyrene described hereinabove.

What we claim as our invention and desire to cover by Letters Patent of the United States is:

1. A process for the preparation of 2,5-diacetoxystyrene which comprises pyrolyzing 2,5-dihydroxyphenylmethyl carbinol triacetate at a temperature of from about 400° C. to about 650° C.

2. A process as defined in claim 1 wherein the temperature is from about 500° to about 520° C.

3. A process as defined in claim 1 wherein the triacetate is dissolved in an inert hydrocarbon solvent.

4. A process for the preparation of a substituted phenylmethyl carbinol having the formula:

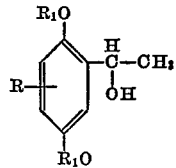

wherein R represents a substituent selected from those consisting of a hydrogen atom and methyl and ethyl radicals and $R_1$ represents a substituent selected from those consisting of a hydrogen atom and an acetyl radical, which comprises hydrogenating a compound having the formula:

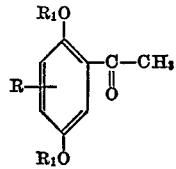

wherein R and $R_1$ are defined above, which is dissolved in an inert solvent, in the presence of a hydrogenation catalyst, selected from the group consisting of Raney nickel W-6, Raney nickel W-7, copper chromite and platinum oxide catalysts, and under an elevated pressure of hydrogen.

5. A process as defined in claim 4 wherein the inert solvent is selected from those consisting of aliphatic alcohols containing from one to eight carbon atoms and aliphatic ethers containing from one to 12 carbon atoms, the hydrogen is under a pressure of from about 25 to about 1000 pounds per square inch, and the temperature is from about 20° to about 50° C.

6. A process as defined in claim 5 wherein the inert solvent is methanol, the hydrogenation catalyst is Raney nickel W-6, the hydrogen is under a pressure of from about 25 to 100 pounds per square inch, and R and $R_1$ each represents a hydrogen atom.

7. A process as defined in claim 4 wherein the $R_1$ substituent located in the ortho position to the acetyl group represents a hydrogen atom, the inert solvent is selected from those consisting of aliphatic alcohols containing from 1 to 8 carbon atoms, the hydrogenation catalyst is copper chromite, the hydrogen is under a pressure of from about 1000 to 6000 pounds per square inch and the temperature is from about 100° C. to about 115° C.

8. A process as defined in claim 7 wherein the inert solvent is ethanol and from about 1 to about 30 percent of copper chromite is employed based on the weight of the carbinol compound being hydrogenated.

9. A substituted phenylmethyl carbinol triacetate having the formula:

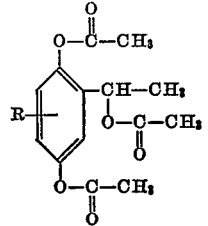

wherein R represents a substituent selected from those consisting of a hydrogen atom, a methyl radical and an ethyl radical.

10. A compound as defined in claim 9 wherein R represents a hydrogen atom.

References Cited in the file of this patent

UNITED STATES PATENTS

| | | |
|---|---|---|
| 2,265,141 | Bruson | Dec. 9, 1941 |
| 2,276,138 | Alderman et al. | Mar. 10, 1942 |
| 2,407,183 | Soday | Sept. 3, 1946 |

FOREIGN PATENTS

| | | |
|---|---|---|
| 10,590 | Great Britain | Mar. 11, 1899 |